United States Patent [19]

Carollo

[11] 4,131,345
[45] Dec. 26, 1978

[54] VISIBLE LIGHT PROJECTION DEVICE

[75] Inventor: Jerome T. Carollo, Ormond Beach, Fla.

[73] Assignee: The Singer Company, Binghamton, N.Y.

[21] Appl. No.: 845,884

[22] Filed: Oct. 27, 1977

[51] Int. Cl.² ............................................. G03B 29/00
[52] U.S. Cl. ..................................... 352/132; 352/70; 352/85; 352/133; 35/12 N
[58] Field of Search .................. 352/70, 85, 132, 133; 35/11 A, 12 N, 25

[56] References Cited

U.S. PATENT DOCUMENTS

| 3,281,519 | 10/1966 | Giordano | 35/12 N |
| 3,854,802 | 12/1974 | Gazale | 352/70 |

Primary Examiner—Monroe H. Hayes
Attorney, Agent, or Firm—Stephen J. Schultz; Jeffrey Rothenberg

[57] ABSTRACT

A visible light projection device for producing an image on a screen in a variety of angular orientations and sizes. The device includes two servo controlled prisms rotatable about two transverse axes. The prisms serve to direct an input image to a zoom lens for reprojection of the image on a suitable screen in a variety of angular positions and image sizes.

12 Claims, 4 Drawing Figures

VISIBLE LIGHT PROJECTION DEVICE

BACKGROUND OF THE INVENTION

The invention herein described was made in the course of or under a contract or subcontract thereunder, with the department of the Navy.

1. Field of the Invention

This invention relates to a light projection device and more particularly to such a device useful in visual display systems for flight simulators.

2. Prior Art

Apparatus and methods are known for projecting variable size images at various locations on spherical screens. Such projection devices have application in wide angle visual display systems for flight simulators, where they are used to insert an Area of Interest (AOI) image in a background scene.

In a typical display system of this type, used for Navy pilot training, a camera forms an image of a subject, such as an aircraft carrier mock-up, and an AOI projection system projects the image of the carrier on a spherical viewing screen that includes a background image of sea and sky. As the pilot maneuvers his trainer, the AOI projection system will alter his view of the aircraft carrier to correspond to what the pilot would actually view in flight. Due to the speed and manueverability of present Navy flight systems, this projection system must be able to rapidly sweep the image of the carrier across a large sector of the pilot's field of view. It is also necessary that the simulator enlarge and diminish the size of the image as the pilot proceeds towards and recedes from the aircraft carrier.

An earlier designed projection system sought this capability with a fixed zoom lens for size variation and a rotatable rather sophisticated prism-lens configuration for bending the light rays to achieve proper location of the image relative to the pilot. According to this prior design, a projector transmits an image of the aircraft carrier to the zoom lens, which then sends the image through the rotating optics to be projected upon the viewing screen. This design presently requires a sophisticated optical light path with many sophisticated intervening elements. The improvements the present invention offers over this earlier design can best be understood through a closer study of the functioning of the components of the earlier design.

Separated from the projection device, a scale model of an aircraft carrier is continuously viewed by a closed circuit television camera. The camera transmits an image of the carrier to an image projector which transmits light rays from the image it creates to a zoom lens.

The AWAVS zoom lens is comprised of a number of lenses packaged in a unit to achieve its variable image size capability. It can view an object and transfer a variable size image of that object to a well-defined field while maintaining proper image focusing and resolution. To achieve these capabilities, the lens is designed with an aperture, commonly called an iris, and at least one entrance and one exit lens, the exact number of these lenses being variable and not relevant to the present consideration. The zoom's entrance pupil is defined as the image of the iris created by the entrance lens and is located on the entrance side of the zoom. The exit pupil is similarly defined as the image of the aperture transmitted by the exit lens and located on the exit side of the zoom. It should be noted that these designations are for convenience in describing a particular arrangement and by merely rotating the lens 180° along the transmission axis, the exit pupil becomes the entrance pupil and vice versa. To change image size, either the entrance or exit lens and its corresponding pupil must move. As either the exit or entrance lens of the zoom is moved to achieve image size enlargement or reduction, the corresponding exit or entrance pupil moves along the light path either toward or away from the zoom. With the zoom lens positioned in the light path prior to the rotating prisms, it has been found that the positioning of the moving pupil (either entrance or exit) places serious constraints on the system capabilities. If, for example, the zoom is oriented relative to the projector to operate with a moving exit pupil, the image resolution on the screen degrades, and in fact, the image may disappear from view. To correct this problem, "trombones" consisting of prisms capable of shortening and lengthening the optical path to fix the pupil relative to the succeeding rotating optics were tried. Even using these "trombones," however, complex and bulky optical devices called telecentrics are still required to allow angular movement of the image. These telecentrics require design techniques which are at the forefront of the field of optical design, and due to the bulk and sensitivity required, seriously degrade system stability and rotational capabilities. If the output field of view of the zoom is large, the size of the telecentrics increase resulting in a greater load for the system servos which rotate these optics. The telecentrics increase the number of air-to-glass surfaces after the zoom lens for the intervening optics, thereby increasing the probability of system misadjustment or misalignment; and a reduction in total light transmission due to the large number of surfaces resulting in reduced image brightness.

To avoid the use of bulky telecentrics, the zoom lens could be rotated 180° about the light path to orient the moving pupil towards the projector. This procedure fixes the exit pupil of the zoom, thereby eliminating the need for much of the bulky telecentrics and trombones needed when that pupil was moving. However, other more serious problems result from the movement of the entrance pupil along the entrance portion of the light chain. Images, including not only the subject (e.g., the aircraft carrier), but also the mechanical portions of the light projector itself, are flashed upon the screen. Rather imprecise yet clearly observable images of the physical elements such as the schlieren bars and the electron gun are observable. These images are totally unacceptable.

SUMMARY OF THE INVENTION

The present invention overcomes the above-mentioned disadvantages of the earlier designs through a zoomable image projection system that no longer requires tracking of the moving pupil of one zoom lens. This improvement eliminates the need for much of the cumbersome intervening optics, thereby improving system reliability, optical efficiency and mechanical rotational capabilities. More specifically, the system now requires no intervening telecentric devices, thereby reducing the requirements placed on the servos, which formerly rotated these devices. As an added system bonus, it has been empirically discovered that design requirements of the invention help eliminate difficulties with spherical and chromatic abberation. Finally, the simpler optical design has added a dimension of system flexibility by allowing ready interchange of zoom lenses.

Unlike prior designs, which taught that the best image projection resulted if one held the zoom lens stationary while rotating the telecentrics and light bending prisms, the present invention provides for a rotating zoom lens and prisms. This new construction receives the subject image from the light projector, transmits the rays emitting from this image to the rotating prism-zoom arrangement, and finally reprojects the image on the viewing screen. The system now utilizes two revolving right angle prisms which are mounted to two mechanical servos and rotate about axes perpendicular to each other, and a zoom lens mounted to a housing for the rotating prisms at the end of the optical chain. With this construction, a fixed entrance pupil of the zoom lens faces the rotating optics and the moving exit pupil faces the viewing screen. By the placement of a simple field lens (sometimes referred to as a relay) between the rotating optics and the subject-image projector, the fixed entrance pupil can be made to coincide with the exit lens of the subject image projector. As noted in the discussion of the prior art, this repositioning of the entrance pupil to coincide with the exit lens of the image projector insures the final image transmitted to the screen includes no shadow images of the subject image projector's internal mechanism. By adding a second field lens between the subject-image projector and the rotating optics configuration, it is possible to re-image the incident subject image at a point in the zoom lens' field of view, so it can be retransmitted to the screen. Thus it is seen that the stationary relay system serves a two-fold function: it creates a real image of the incident subject at a position where the zoom lens is capable of retransmitting that image, and it serves to redirect the fixed entrance pupil of the zoom to a position coincident with the exit lens of the stationary-image projector.

One very important feature of this new design is that it obviates the need to track the exact position of the moving exit pupil. It has been determined empirically that the zoom lens can project an in-focus variable size image regardless of where the exit pupil is located. No bulky telecentrics or trombones are required to fix the pupil in the light path subsequent to the zoom lens.

This placement of the zoom lens at the end of the light chain has thus resulted in a number of beneficial effects on the system design and performance. The new system is much simpler than the earlier designed system. While the earlier scheme requires state of the art design for proper imaging, the present invention need only relay the subject image to the zoom's field of view and relay the fixed entrance pupil of the zoom back to the exit lens of the projector. These two requirements can be accomplished by a simple field lens configuration located at a precise position in the optical path in advance of the point where the light rays are bent by the rotating prisms. The present invention's lack of complex rotating telecentrics facilitates the attainment of system stability. The decreased size and lower number of system elements necessarily results in fewer system malfunctions from ambient vibration of the system's environment.

By eliminating the bulky telecentrics from the rotating portion of the system, the mechanical servos can achieve the high rates of angular velocity and acceleration needed to realistically simulate flight conditions. Angular coverage of ±90° in elevation and ±120° in azimuth which were unattainable utilizing the bulky rotating optical system of the earlier design are now practical. Also, the simplification in system design has reduced the number of glass-to-air surfaces with reduced loss of light intensity due to surface reflection. This increased light output is of major importance because it allows greater design flexibility in positioning the zoom relative to the screen. In the prior practice, the light intensity was reduced to the point that, for the pilot to adequately view the image, the screen had to be a high-gain model to insure that reflected rays would not be highly dispersed. This constraint required the exit pupil of the zoom to be conjugate to the viewer's eye. Since the present invention provides a brighter image for screen reflection, adequate viewing intensity is obtained with a less-highly polished reflecting surface. Using this less-highly polished surface, the incident light rays are more highly dispersed when they impinge upon that surface and the prior constraint on the zoom pupil-pilot eye configuration no longer exists.

The higher image intensity reduces another rather specialized technical requirement of the trainer system. In the prior design, the AOI image and the background image were of approximately the same intensity. To clearly view the AOI image, it was necessary therefore to blank out or omit a portion of the background image at the location of the AOI image. With the added image intensity of the present invention, however, the AOI image is so dominant that background blanking may in some cases be omitted.

The new simpler optical design allows added system flexibility by allowing one to insert zoom lenses with differing lens characteristics. The earlier design required complete system re-design if a different zoom lens was substituted. By inserting the proper field lenses in a light relay, the new zoom pupil can be re-imaged to coincide with the subject projector exit lens, and the intermediate real image can similarly be repositioned for correct zoom field-of-view matching.

The intermediate image, when positioned between the system's two rotating prisms, has the effect of reducing the spherical and chromatic abberations introduced by the first of these prisms. An intermediate real image was present in the prior design, but was located where no abberation diminishing occurred due to its position.

From the above it is apparent that this invention provides an improved system for projecting a variable size image on a concave screen for viewing in a number of angular positions. The various features and advantages of the invention will become more apparent from the following detailed description, considered in connection with the accompanying drawings.

DETAILED DESCRIPTION

Figure 3:
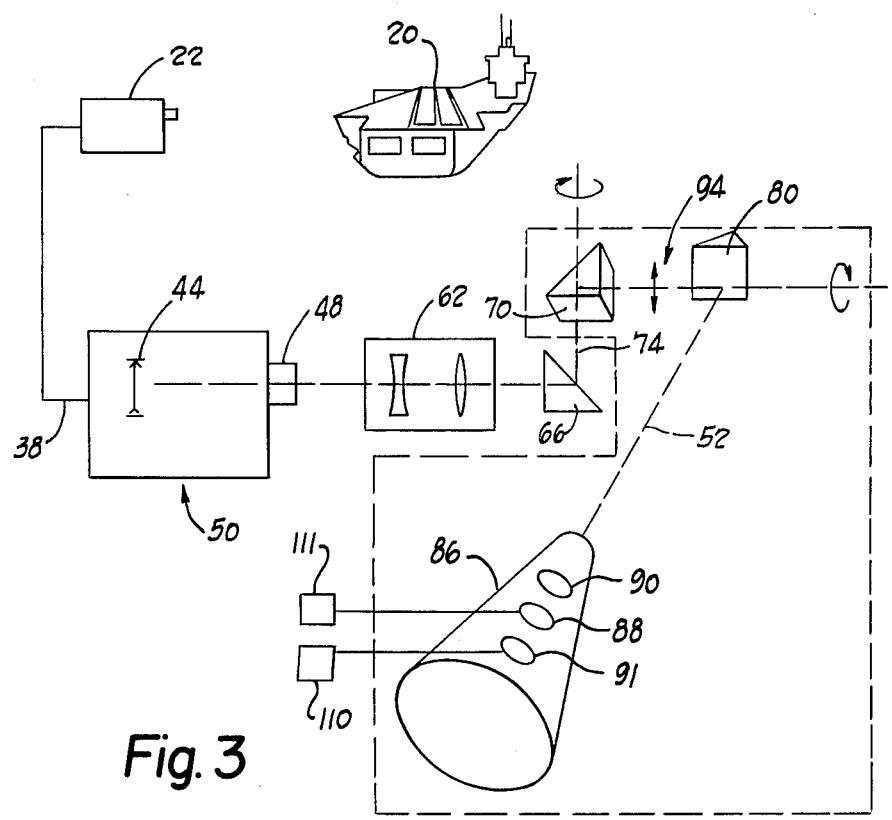
FIG. 3 is a schematic representation of the elements of the variable size, variable angle, image projector.
Figure 4:
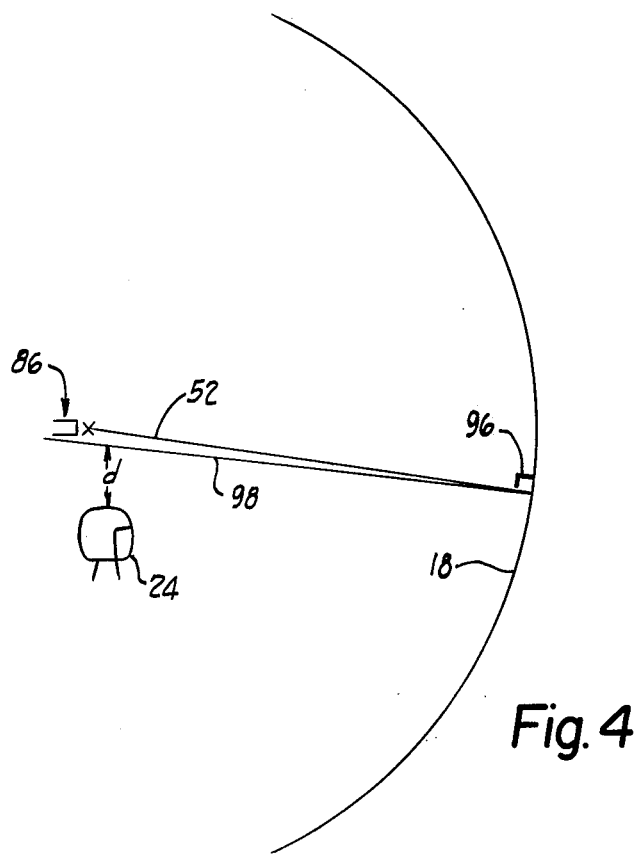
FIG. 4 shows the relative position of the pilot, screen, and projection device of the invention.

With reference to the drawings, the system shown comprises a background image projector 10, an AOI projector 12 mounted on a projector housing mount 14, a blanking camera 16, a viewing screen 18, a scale model of an aircraft carrier 20 (see FIG. 3), and a TV camera 22 (FIG. 3). These elements cooperate in operation to provide a simulated flight display to be used in training a pilot 24 (FIG. 4) as he views the screen.

The background projector 10 illuminates the screen 18 with a wide angle scene, for example a sea-sky image on which the image of an aircraft carrier will be superimposed by the AOI projector 12. The AOI 12 receives a subject picture, such as the image of the aircraft carrier 20 (FIG. 3) and reimages that image on the screen 18. The AOI projector provides the capability of imaging the subject picture in a variety of sizes and angles with relation to the viewing pilot 24. This allows the pilot to see the aircraft carrier as it would appear to him in actual flight. The relative motion of the aircraft carrier is determined by the signals sent to the AOI projector by a pilot's controlled simulation computer (not shown). The blanking camera 16 works by means of a feedback arrangement which locates the position of the AOI image provided by the AOI projector 12 and causes the background projector 10 to blank out or cut a hole in its image at the position of the AOI image. The viewing screen 18 forms a segment of a sphere and presents a surface on which the AOI image can be projected in a variety of different positions. The TV camera 22 views the mock-up aircraft carrier 20 (typically through an optical probe not shown) and by means of electrical interconnections 38 provides a continual image of the aircraft carrier to the AOI projector 12.

The background projector 10 comprises a main housing 28 which is mounted on the projector housing mount 14 and includes a TV projector. The background projector further comprises an extension 32 on which is mounted a wide angle projection lens 34. This wide angle projection lens enables the sea-sky scene to be projected over a large area of the spherical screen 18 to simulate the pilot's field of view.

Figure 1:
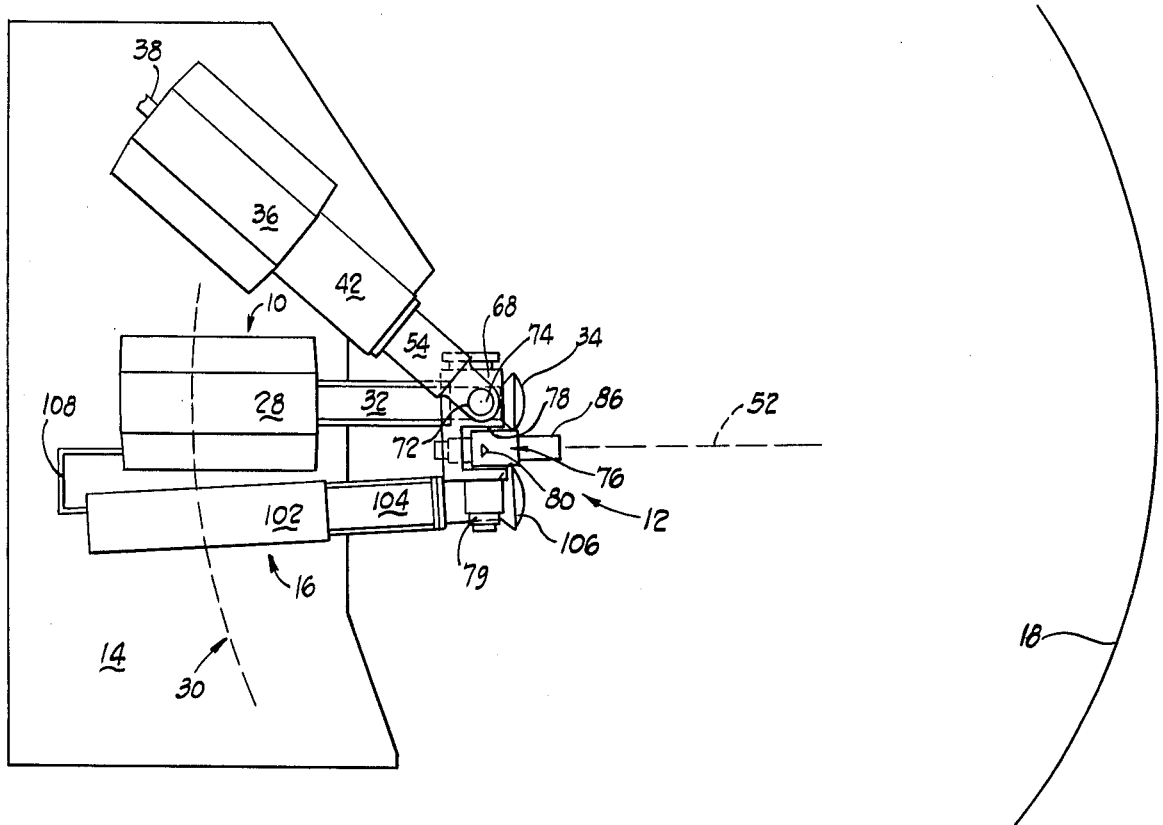
FIG. 1 is a top plan view of a flight simulator embodying the present invention, including the viewing screen and projection apparatus.
Figure 2:
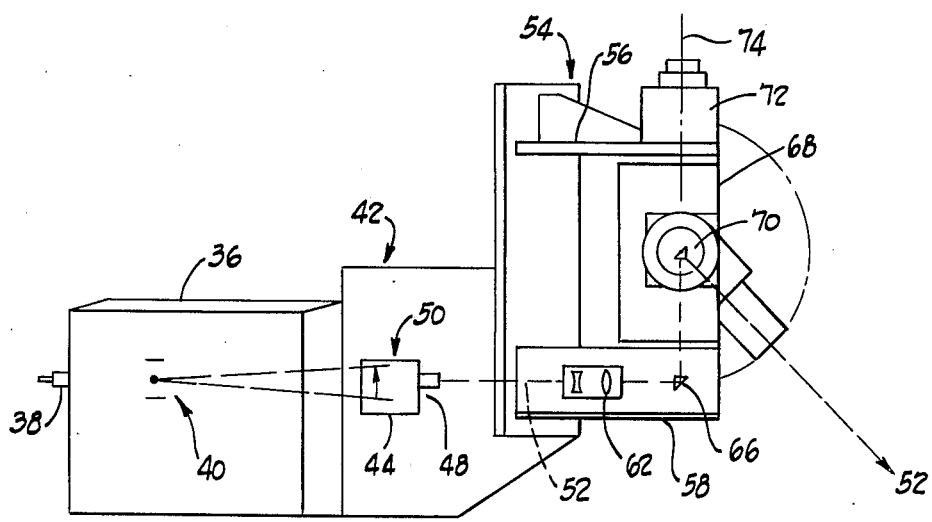
FIG. 2 is a side elevational view of the variable angle variable size image projection apparatus of the flight simulator of FIG. 1 with AOI in a different position.

The AOI projector 12 is shown above the background projector 10, as seen in FIG. 1 and projects an image received from the TV camera 22 onto the screen 18. The AOI projector comprises a main housing 36 mounted on the projector mount 14. An electrical interconnection 38 connected to the main housing 36 carries the television signal from the TV camera 22 to an electron gun 40 located within the main housing. The AOI projector further includes a secondary housing 42 directly connected to the main housing 36. A screen (not shown) is located inside the secondary housing. Impingement of electrons from the electron gun 40 upon the screen form a so-called raster image 44. Light rays from the raster image exit from the secondary housing 42 through an exit lens 48. The raster image exit lens and secondary housing in combination will hereafter be called a subject-image projector 50, which transmits an image of the raster 44 along a light path 52 which will be bent and modified by succeeding optics of the AOI projector. The subject-image projector 50 might typically comprise a TV projector such as a General Electric PJ7150 light valve projector.

An extension arm 54 is connected to the secondary housing 42 and receives the light from the subject-image projector 50. The extension arm consists of two separate arm portions, one portion 56 located above the other portion 58. The upper portion 56 serves as a support for pivotal components of the AOI projector. The lower arm 58 serves partially as a mount and also houses a lens relay system 62 and a stationary prism 66. The lens relay system 62 comprises one or more individual lenses that transmit the light along path 52 and serve other purposes that will become apparent following the further description of the AOI projector below.

After exiting from the relay lens configuration, the light path 52 enters the stationary prism 66 which serves to bend the light path 90° from its initial path. Attached between the projection arm portions 56 and 58 is a rotatable azimuth housing 68. This housing is attached pivotally to the projection arms to rotate about an axis 74 perpendicular to the table-like projector housing mount 14. In the embodiment shown, the axis 74 is vertical. The light from the stationary prism 66 enters the rotating azimuth housing and travels to an azimuth prism 70. Since the azimuth prism 70 is mounted with the rotating azimuth housing, it also rotates about the axis 74. The azimuth prism 70 serves to again bend the light train 90° from its incident path. The rotation of the housing 68 and prisms 70 is achieved by a servo motor 72 which rotates these elements about the vertical axis 74. Thus, by rotating the housing 68 the incident light path 52 can be rotated about a vertical axis to achieve an azimuth variation in the final location of the projected image.

After emerging from the azimuth rotating prism 70, the light path 52 travels along a substantially horizontal path and impinges upon a rotatable elevation prism 80. The elevation prism is located within an elevation housing 76 which fits into a recess 78 in the azimuth rotatable housing 68. The rotatable elevation prism 80 bends the light path through another 90° angle. Mounted at one end of the rotating azimuth housing 68 is a servo 79 which provides the elevation rotation capability of the prism 80. Thus, by rotating the prism 80 about an axis which is substantially horizontal in the orientation shown, the light path that exits from the second rotating prism can be aimed at various elevation positions and a variable elevation capability is achieved.

From the above it will be understood that the two rotating prisms 70, 80 provide an angular variation capability for a projected image of the flight simulator. By coordinating the movements of the two rotating servos 72, 79, it is possible for the system to position the final image at a variety of locations on the spherical screen. In its present format the system can achieve an azimuth angle variation of ±120° about a midpoint position. The elevation capabilities of the present system are ±90° about a midpoint position.

After leaving the rotatable elevation prism 80, the light path 52 travels through a zoom lens 86 which is attached to the rotatable elevation housing 76 and which provides final image enlargement and diminution. The zoom lens comprises an aperture 88 (see FIG. 3) an entrance lens 90, and an exit lens 91. The zoom lens is mounted to the elevation prism housing 76 in a way to allow ready interchange of that zoom lens with other zoom lenses of varying optical characteristics. Since the specific design of the zoom lens is not a part of this invention, the details of the zoom lens' design are omitted from FIG. 3 and the lens has been presented in schematic form only. In operation, the exit lens or lenses 91 of the zoom are moved relative to the aperture 88 by a zoom servo 110 and thereby produce the variable size image capability the zoom lens was designed to fulfill. At greater zoom focal lengths the aperture 88 diameter is automatically reduced. In the present embodiment, however, the zoom aperture is driven by a servo 111 to maintain a constant aperture while zooming, thus providing a consistent level of screen illumination. Both the rotating prism servos 72, 79 and the control mechanism of the zoom lens are electrically coordinated with the pilot's maneuvering by means of the simulation computer (not shown). Thus, the zoom lens 86, working in conjunction with the two rotating prisms 70, 80, produces a variable size image upon the screen 18 at a variety of angularly displaced locations.

From FIG. 3 it will be understood how the relay lenses must be adjusted to achieve proper system functioning. For the zoom lens to operate effectively, it must receive an image located within its viewing field for retransmittal. In the present design the zoom cannot adequately view the raster image so an intermediate image 94 must be provided at a position between the two rotating prisms 70 and 80. This is achieved by proper readjustment of the relay lens configuration 62. The placement of this intermediate image between the prisms, in addition to providing an image for the zoom lens, results in elimination of a portion of the chromatic and spherical abberations introduced by the azimuth prism 70.

The relay lens 62 (see FIGS. 1 and 3) is also configured to transmit a stationary entrance pupil created by the entrance lens 90 of the zoom lens back along the light path 52 towards the subject image projector 50 until it coincides with the subject-image projector's exit lens 48. When this stationary entrance pupil is coincident with the subject-image projector lens, the subject image is transmitted to the screen without shadow imaging of the subject-projector's mechanical elements.

The light path 52 exits from the zoom lens 86 and is projected upon the screen 18. This screen comprises a hemispherical-shaped surface which is positioned relative to the pilot 24 and the zoom lens 86 (see FIG. 4) so the light path from the zoom lens impinges upon the screen in a nearly normal angle 96 (see FIG. 4). Due to the added image intensity achieved by the present invention, it is no longer necessary for the pilot to be located along a line 98 conjugate to the incident light path. In the present embodiment, the pilot 24 can be offset a distance d from this conjugate line and maintain adequate viewing capability.

The arrangement shown retains a blanking camera 16 for blocking out that portion of the background image that coincides with the AOI image of the subject, e.g., the aircraft carrier. The blanking camera 16 (see FIG. 1) comprises a main housing 102, a lens mounting arm 104, and a viewing lens 106. In operation, the blanking camera 16 detects the position on the viewing screen of the AOI image and determines the location. By sending the proper blanking signals through an electrical interconnection 108, the blanking camera instructs the background display camera 10 what portion of the sea-sky background image to omit. This feedback arrangement avoids double imaging on the screen at the position of the aircraft carrier and thereby provides a sharper image.

The above-mentioned elements, working in conjunction with each other, provide a variable sized image projection apparatus capable of transmitting a subject image through angles of ±120° azimuth and ±90° in elevation. Through controls operated by the pilot, which interconnect to the control mechanisms of the AOI projector, the present invention provides a pilot training device that avoids the need for complex and difficult-to-design optical elements.

While the present invention has been described with particularity it should be understood that various modifications or alterations may be made therein without departing from the spirit and scope of the invention set forth in the appended claims.

What is claimed is:

1. A visible light projection device capable of projecting an image from an image source to a screen in a variety of angular orientations and sizes comprising:
    (a) a first prism rotatable about a first axis for receiving and bending incident light rays;
    (b) a second prism for receiving light rays from the first prism, the second prism rotatable about a second axis, transverse to the first axis, and mounted for revolution about said first axis;
    (c) a zoomable lens fixed relative to the second prism and capable of receiving the light rays from the second prism and projecting an image on the screen.
    (d) a first means for controlably rotating said first prism and for revolving said second prism; and
    (e) second means for rotating said second prism.

2. The visible light projection device of claim 1 wherein the prisms are right angle prisms.

3. The visible light projection device of claim 2 wherein a spatial separation exists between the first and second prisms which is fixed.

4. The visible light projection device of claim 3 wherein the zoomable lens comprises:
    (a) at least one entrance lens spatially fixed relative to the second prism;
    (b) at least one movable exit lens; and
    (c) means defining aperture located between the exit and entrance lenses.

5. A visible light projection device capable of producing an image on a screen in a variety of angular orientation and sizes comprising:
    (a) a subject-image projector with an exit lens;
    (b) an optical relay with at least one field lens capable of transmitting light rays from the exit lens;
    (c) a first servo mechanism;
    (d) a first prism rotatable about a first axis by the first servo mechanism for receiving and bending incident light rays;
    (e) a second servo mechanism;
    (f) a second prism rotatable by the second servo mechanism for receiving light rays from the first prism, the second prism being rotatable about an axis transverse to the first axis; and
    (g) a zoomable lens fixed relative to the second prism and capable of receiving the light rays from the second prism and projecting the subject image onto the screen.

6. The visible light projection device of claim 5 wherein the prisms are right angle prisms.

7. The visible light projection device of claim 6 wherein spatial separation exists between the first and second prisms which is constant.

8. The visible light projection device of claim 7 wherein the zoomable lens comprises:
    (a) at least one entrance lens, spatially fixed relative to the second prism;
    (b) at least one movable exit lens; and
    (c) means defining an aperture located between the exit and entrance lenses.

9. The visible light projection device of claim 8 wherein the zoomable lens and the relay are constructed and arranged such that an image of the aperture created by the entrance lens coincides with the exit lens of the projector.

10. The visible light projection device of claim 9 wherein the relay and first prism are constructed and arranged such that an image of the subject image is created between the first and second prisms.

11. The visible light projection device of claim 10 which further comprises a third right angle prism for receiving light rays from the relay, bending them, and transmitting them to the first prism.

12. A visible light projection system capable of producing an image in a variety of angular orientations and sizes comprising:
 (a) a source for providing a subject image;
 (b) a subject image projector with exit lens for projecting light rays from said subject image;
 (c) means for transmitting said subject image from the source to the subject image projector;
 (d) an optical relay for receiving the light rays from the exit lens and retransmitting them;
 (e) a first prism rotatable about a first axis, for receiving and bending the light rays;
 (f) a second prism for receiving light rays from the first prism, the second prism rotatable about a second axis transverse to the first axis and mounted for revolution about said first axis;
 (g) a zoomable lens fixed relative to the second prism for receiving the light rays from the second prism and projecting a final image;
 (h) a concave viewing screen for displaying the final image;
 (i) background projector means for creating a background image on said screen;
 (j) means for determining the position of the final image on the screen and for instructing the background projector means to omit a portion of the background image co-incident with the final image.

* * * * *